March 8, 1949.  G. A. MITCHELL  2,463,548
FILM DRIVE SYSTEM

Filed Sept. 4, 1945  2 Sheets-Sheet 1

INVENTOR
GEORGE A. MITCHELL
BY
ATTORNEYS

March 8, 1949. G. A. MITCHELL 2,463,548
FILM DRIVE SYSTEM
Filed Sept. 4, 1945 2 Sheets-Sheet 2

FIG. 3.

INVENTOR
GEORGE A. MITCHELL
BY
Burkelew & Santlebury
ATTORNEYS

Patented Mar. 8, 1949

2,463,548

UNITED STATES PATENT OFFICE 2,463,548

FILM DRIVE SYSTEM

George A. Mitchell, Pasadena, Calif., assignor to Mitchell Camera Corporation, West Hollywood, Calif., a corporation of Delaware Application September 4, 1945, Serial No. 614,281

5 Claims. (Cl. 88—17)

The present invention refers generally to film moving apparatus in which a film, driven at uniform or substantially uniform average speed past an exposure aperture or other fixed point, is taken up by a take-up reel or spool which must be driven at a speed either incommensurate with the film speed at the exposure point, or at a speed which progressively varies as the roll of film on the spool increases in diameter. In speaking here of uniform speed, that is meant with relation to the speed of the driving mechanism from which both the film movement and the take-up device are driven.

In motion picture cameras and projectors, and in sound recorders and reproducers, a movement mechanism of one kind or another drives the film past an exposure aperture at an average uniform speed. In a typical instance, the film is taken up from the feed sprocket of the movement by a take-up reel or spool on which the film is wound in a coil of constantly increasing diameter. The take-up spool must be driven in such manner as to maintain tension on the film and to compensate for the varying diameter of the coil. Although various other expedients have been proposed, the commonly adopted drive for the take-up spool is one involving frictional slippage—for example, a belt drive maintained under suitable tension to slip at the desired film tension.

Any such frictionally slipping drive is objectionable on at least two accounts; it is subject to continuous wear and possible mal-functioning or complete break-down, and it consumes an amount of power which is not an inconsiderable fraction of the total amount required to drive, for example, a motion picture camera. Driving motors for such cameras must be larger and heavier than would otherwise be necessary; and that is a matter of considerable importance particularly in hand cameras.

The general purpose and objective of the present invention is the elimination of frictional slippage and power losses in the drive of take-up devices. I have discovered that, with proper proportioning with regard to relative speeds, gear ratios and film tensions, the film movement and the take-up can be driven from two driven members of a differential gearing, the driving member of which is driven from any suitable power source, preferably one of constant speed. With the movement and take-up driven in that manner from a constant speed source, the movement speed necessarily varies as the rotational speed of the take-up varies with increasing diameter of the film coil; but I find that, with proper proportioning of the driving mechanism, the film may be kept under proper take-up tension and the movement speed may be maintained constant within a very small percentage even though the film coil diameter varies by a factor of four or more.

The accompanying drawings illustrate a typical application of my invention to a motion picture camera. In those drawings:

Fig. 3 is a schematic elevation in the same aspect as that of Fig. 2, illustrating the drive mechanism in modified form.

Figure 1:
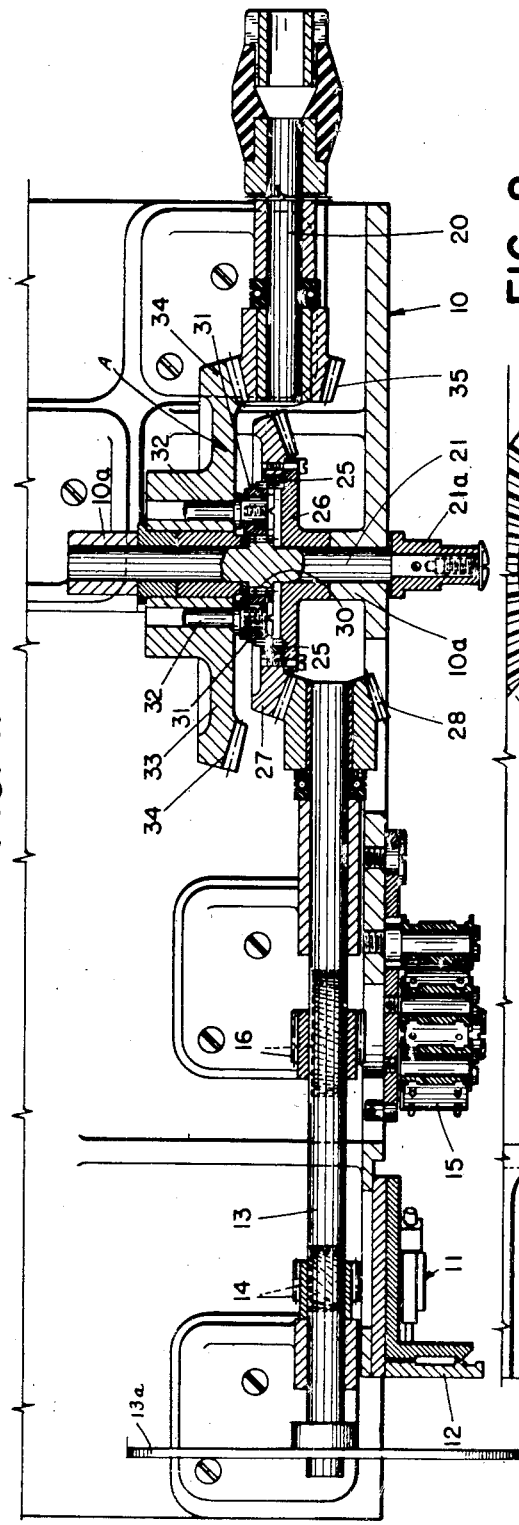
Fig. 1 is a plan-section showing an illustrative and typical form of my drive mechanism.

In the drawings a typical mounting plate or bracket is shown at 10, to carry to various parts of the mechanism. The numeral 11 designates an intermittent film driving mechanism or movement which drives the film past an aperture (not shown) in aperture plate 12. The intermittent movement needs no detailed description, as it can be of any type and kind and, in fact, can be a continuous film driving movement. Whatever its type and character, it will be assumed merely for the purpose of this description that the film movement is driven from movement shaft 13 by gearing 14 in such ratio that the film is moved past the exposure axis through the distance of one frame for each rotation of shaft 13. Shaft 13 as here shown is also the shutter shaft carrying the rotating disk shutter 13a.

The film moving mechanism as here shown also includes the large film feeding sprocket 15 which is driven by gearing 16 from shaft 13 at such a ratio that the film, held in engagement with the upper side of the sprocket by rollers 17, is fed into the upper film loop and toward the intermittent movement at a rate of one frame for each revolution of shaft 13, and the film also held in engagement with the lower side of the sprocket by rollers 18 is fed away from the lower loop at the same rate. The film is thus fed to and through the intermittent movement and away from it, at the rate of one frame for each revolution of shaft 13. That particular relation of film movement and shaft rotation is of course not necessary; but it is a common relationship and is here adopted for simplicity of description and discussion.

The initial or primary drive shaft for the mechanism is shown at 20 and may be driven by any suitable power source, preferably at a constant speed. A synchronous motor drive may be taken as typical. The film take-up shaft, or the shaft which may drive the film take-up through gearing, is shown at 21. In Fig. 1 the end of shaft 21 is shown equipped with a bushing 21a to take the film spool or reel directly; and in some instances that may be the arrangement. On the other hand, as shown in diagram in Fig. 3, shaft 21 is connected by the gearing train 22, 23, 24 with shaft 21b which carries the film take-up spool 29. In either case shaft 21 is typically a film take-up drive shaft. It is mounted in bearings 10a in frame bracket 10. Gear 22 of Fig. 3 may be mounted on the end of shaft 21 in place of the bushing 21a which is removed.

Primary drive shaft 20 drives both the movement shaft 13 and take-up drive shaft 21 through the intermediary of a differential gear mechanism. That differential mechanism may be of any of various known types. For instance it may be of the type commonly used in automobiles where the two driven gears are ring gears of equal diameter, and the bevel-gear planetary or planetaries operate between the opposed toothed faces of the two ring gears. However, I prefer to utilize a differential mechanism of the type employing an external ring gear, and internal sun gear, with an intervening planetary or planetaries which are in the form of spur gears; and I show such a type of differential mechanism in the drawings.

The internally toothed ring gear is shown at 25, carried on a disk or web 26 which is journaled freely on shaft 21 to rotate relative to that shaft. This ring gear, in the typical design here shown, drives the film movement, and although it may drive the film movement directly or, what amounts to the same thing, through an even ratio gear connection, I here show the ring gear as driving movement shaft 13 through a gearing connection having a ratio of three-to-one. Ring gear web 26 carries the bevel gear 27 which meshes with the smaller bevel pinion 28 on movement shaft 13.

The sun gear of the differential is shown at 30 directly on take-up drive shaft 21. Two planetaries 31 are shown rotatably mounted on studs 32 which are carried by the web 33 of a bevel gear 34 which meshes with a bevel pinion 35 on initial drive shaft 20. Gear web 33 is journaled on shaft 21 to rotate freely about the shaft axis. The planetary gear mechanism is thus driven through gear 34 and its web 33 which acts as the rotary carrier of the axes of the two planetary gears. That is, the planetary mechanism is driven by driving the carrier of the planetary axes, and the planetary gears in turn drive both the ring gear 25 and the central sun gear 30, the ring gear driving the film movement and the sun gear driving the take-up drive shaft 21.

Figure 2:
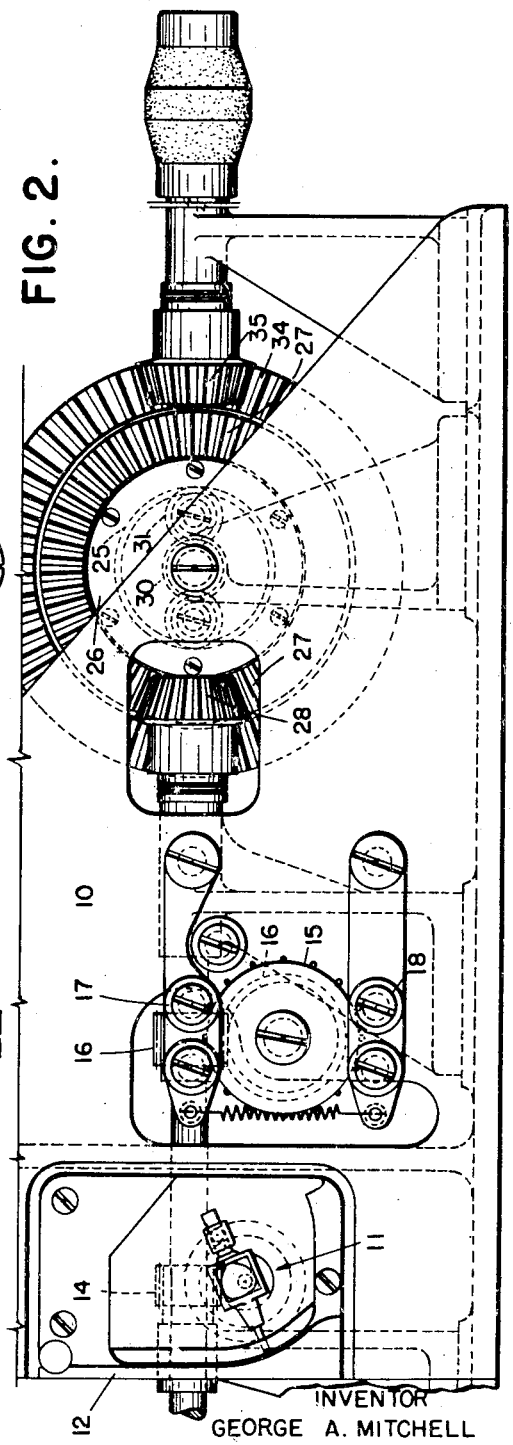
Fig. 2 is an elevation of the parts shown in Fig. 1.

Fig. 3 shows in diagram all of the essential parts of the system, designated by numerals corresponding to those used in Figs. 1 and 2. Film F is shown threaded over feed sprocket 15, through movement 11, under sprocket 15 and then going to the take-up spool 29. As stated before, spool 29 is here shown as driven through gear train 22, 23, 24 from sun gear shaft 21. The gearing ratio shown in Fig. 3 between shaft 21 and spool 29 is three-to-one (in gear sizes) looking from shaft 21 to the take-up. For diagrammatic and descriptive purposes, a carrier A for the planetaries is shown in the form of an arm. This carrier A corresponds to the power driven gear 34 and its web 33 of Figs. 1 and 2. While drive shaft 20 of Fig. 1 has been spoken of as the initial drive shaft for the mechanism, its function is merely to drive carrier A through gears 34, 35. Carrier A is therefore the real initial driving member of the differential train and of the whole drive mechanism.

If we assume that carrier A is rotated clockwise in Fig. 3, then, with sun gear 30 stationary, ring gear 25 is also rotated clockwise at an angular speed determined by $$(1) \qquad \text{Rev.}_R = \frac{R+S}{R}(\text{Rev.}_A)$$

where R and S denote the pitch diameters or numbers of teeth of the ring and sun gears. As shown in the drawings, ring gear 25 has 48 teeth and sun gear 30 has 16 teeth. With the sun gear stationary, the ring gear is driven at ⅔ the angular velocity of carrier A and, with the three to one gearing 27, 28 driving the movement shaft 13 from the ring gear, the latter's angular velocity is four times that of the initially driven carrier A. Assuming that under these conditions it is desired to drive the movement shaft at 960 R. P. M. (16 frames per second) then carrier A is driven at 240 R. P. M. The drive gearing 34, 35 shown in Figs. 1 and 2 has a ratio of one-to-four, so that initial drive shaft 20 is in this instance driven at 960 R. P. M.

With the ring gear driven clockwise in Fig. 3, the reaction from the torque necessary to drive movement 11, transmitted from the ring gear through the planetary to sun gear 30, tends to rotate the latter clockwise. With the sun gear coupled with the take-up spool 29 in the manner illustrated in the diagram of Fig. 3, the reaction torque also tends to rotate the take-up spool clockwise and thus tends to keep the film under tension and to wind the film on the spool as fast as the film is fed forwardly to the spool by feed sprocket 15.

When the spool is empty, at the beginning of a take-up and winding operation, the effective spool diameter is a minimum and the film moves to the spool somewhat as indicated at F₁ in Fig. 3. The particular spool here shown by way of typical illustration has a diameter of about $1\frac{3}{16}''$; and at the end of the take-up and winding operation the diameter of the film coil—the effective diameter of the spool—is about 5''. The film is indicated at F₂ going to the spool at that maximum diameter. The minimum circumference of the take-up spool is approximately equal to 16 frames of the film which is here being used as an illustration (16 mm. film) and the maximum effective circumference of the take-up spool is equal to about 130 film frames.

Due to the fact that sun gear 30 is rotated forwardly to take up the film, the rotational speed of movement shaft 13 and the speed of the movement is at no time as high as it would be with the sun gear stationary and with the initial drive operating at the same speed. When the take-up spool is full, at its maximum effective diameter, the spool is of course rotated only 1/130 of its circumference for each rotation of movement shaft 13. In the particular design and arrangement here shown, that means that the sun gear rotates forwardly only 1/390 of a complete revolution for each revolution of movement shaft 13, and 1/130 of a revolution for each complete revolution of ring gear 25. Calculations and tests have shown that such slight relative forward movement of the sun gear, when the film coil is at maximum diameter, is so small that the drop in speed of movement shaft 13 below the normal selected speed of 960 R. P. M. is quite completely negligible (it is about 2 R. P. M. or a drop in speed of about 0.002). For the purpose of ascertaining the overall variation in the speed of the movement shaft and movement, their speeds at the end of the winding operation may be considered as being the standard selected speed, and the small error resulting from that assumption makes the calculated variation in speed greater than that which actually occurs, rather than less.

The over-all variation in movement speed is ascertained by calculating that speed on the assumption that the sun gear is rotating forwardly at the rate of approximately $\frac{1}{48}$ of a revolution for each revolution of the ring gear. In the arrangement shown in Fig. 3, at the beginning of the take-up operation, spool 29 is rotating forwardly $\frac{1}{16}$ of a revolution for each revolution of movement shaft 13. Sun gear 30 rotates forwardly at one-third the speed of the take-up, and ring gear 25 rotates at one-third the speed of the movement shaft; so that the sun gear rotates forwardly $\frac{1}{48}$ revolution for each revolution of the ring gear. The calculation indicates that the movement shaft, at the beginning of the operation, rotates at about 940 R. P. M. instead of the standard 960. The relative drop in speed, in this particular illustrative case, and checked by actual operation of the mechanism, is thus about 2%. That overall variation in speed is much smaller than the variation commonly resulting from the use of spring motor drives for hand cameras; and of course is also much smaller, and much more uniform, than the variation in any hand driven camera.

Formula 1 assumes the sun gear to be stationary and thus gives only that component of the ring gear speed resulting directly from rotation of carrier A. When the sun gear also rotates, the ring gear has another component of rotational speed, say (2) $\quad \text{Rev.}^1{}_R = -\dfrac{S}{R} (\text{Rev.}_s)$ where the minus sign indicates that clockwise rotation of the sun gear produces counter-clockwise rotation of the ring gear.

The actual rotational speed of the ring gear is then (3) $\quad \text{Rev.}^2{}_R = \text{Rev.}_R + \text{Rev.}^1{}_R =$ $\dfrac{R+S}{R} (\text{Rev.}_A) - \dfrac{S}{R} (\text{Rev.}_s)$ If Rev.$_A$ is 240 R. P. M. as stated before, and Rev.$_s$ is $\frac{1}{16}$ Rev.$^2{}_R$, and the gear ratios are as given before; substitution in (3) gives $$320 \times \dfrac{48}{49}$$

as the value of Rev.$^2{}_R$. The movement speed, three times that value, works out at approximately 940 R. P. M.

The tension maintained on the film by the take-up is determined by the torque which is necessary to drive movement shaft 13, and by the overall gearing ratio between the movement shaft and take-up spool 29. The reaction torque is transmitted through the gear train; and in the particular illustration here given the overall gearing ration between shaft 13 and take up spool 29 is a ratio of three-to-one (stating the ratio in relative gear sizes and looking at the train from shaft 13 to the take-up). Thus, in the illustration given, the torque, in inch-ounces on the take-up spool is one-third that on the movement shaft 13. The absolute torque in inch-ounces, depends upon the torque necessary to operate the movement and other parts connected with shaft 13. In an actual structure, using a standard film movement and using the gear ratios illustrated, the torque on the take-up spool has been found to be sufficient to insure film take-up at the full spool condition.

Many variations may be made in the design, within the limits of gearing ratios which impose acceptable tensions on the film, and within desirable limits for maximum overall speed variation in the movement shaft. As a simple illustration of one variation, ring gear 25 may drive the shutter shaft directly (or, what amounts to the same thing, with a gearing ratio at 27, 28 of one-to-one) and the sun gear shaft 21 may drive take-up spool 29 directly or at a one-to-one gearing ratio. In that case the resulting functioning as regards speed variation is the same as in the illustration given in Fig. 3; and the tension on the film is the same because the gearing ratio through which the reaction torque is transmitted from the movement shaft to the take-up, is still a ratio of three-to-one.

Variations in the relative size of the sun gear, everything else being the same, results in a change in both the over-all speed variation and the film tension. For example, still assuming that the movement and take-up are driven directly from the ring gear and sun gear, an increase in the sun gear diameter results in a correponsding increase in the overall speed variation, the latter being about 3% if the sun gear is increased to half the diameter of the ring gear. And the torque transmitting gear ratio from the shutter shaft to the take-up is changed to two-to-one; that ratio is relatively reduced so the tension on the film is correspondingly increased.

If, in any given arrangement as to relative sun gear diameter and gearing ratio between it and the take-up, the gearing ratio (ratio of gearing sizes) between the movement shaft and the ring gear is decreased, the overall speed variation and the tension on the film are both increased. For example, with the sun gear one-third the diameter of the ring gear, the sun gear driving the take-up directly, and the movement shaft geared to the ring gear with one-to-three gearing (same as in Fig. 3 except that the sun gear drives the take-up directly or at one-to-one ratio) the torque on the take-up is increased by a relative factor of three, compared to Fig. 3 (the torque gear ratio is now one-to-one); and the over-all speed variation is multiplied by three. That is because, with the movement running relatively three times as fast as the ring gear, the sun gear is allowed to move forward relatively three times as fast. But if now, in such a situation, we drive the take-up from the sun gear at a ratio of three-to-one (as in Fig. 3) the relative forward rotation of the sun gear is now reduced by one-third, to be the same as in Fig. 3 or as in the case where both movement and take-up are driven directly. An the over-all gear ratio between the movement shaft and take-up is again three-to-one so that the film tention is decreased to the same figure as when the movement shaft and take-up are driven directly.

To summarize generally, we may consider the effect of the various gear ratios (ratio of gear sizes) as they are looked at from the movement shaft to the take-up.

The over-all speed variation of the movement shaft depends solely on the rate of forward rotation of the sun gear with relation to the rotation of the ring gear, when both rotations are measured peripherally or in number of teeth. Increasing the relative size of the sun gear (decreasing the gear size ratio from ring gear to sun gear) increases the forward peripheral rotation of the sun gear and increases the speed variation. Decreasing the gear size ratio from the movement shaft to the ring gear has the result of increasing the relative advance of the sun gear because the ring gear moves more slowly. Decreasing the gear size ratio between the sun gear and the take-up has a direct effect of allowing the sun gear to advance more rapidly. Correspondingly, increase in the gear size ratio at any point in the train, looked at from the movement shaft to the take-up, has the effect of decreasing the relative advance of the sun gear and decreasing the over-all speed variation.

Consequently, increase in the over-all gear size ratio from the movement to the take-up, regardless of the point or points at which the increase is made, decreases the take-up torque and the film tension and also decreases the over-all speed variation at which the movement is driven. Accordingly, the optimum design for any given situation may be said to be reached when the over-all gear size ratio from movement to take-up is as high as it may be, consistent with a sufficient pull on the film at maximum take-up diameter, to insure the film being taken up and wound sufficiently tightly. The over-all speed variation is then the minimum.

In reaching the optimum design, involving minimum speed variation and minimum film tension, the fact that movement shaft 13 is subject to considerable inertia is of importance. The film movement 11 applies some inertia, but the rotary shutter 13a on shaft 13 applies a relatively large inertia which tends to keep the movement shaft rotating at a constant speed in the event that the controlling connection formed by the tensed film between the movement shaft and the take-up should for any reason be disrupted. That disruption of connection may occur by reason of temporary tightening slippage of the coil of film on the take-up spool, and is the more likely to be caused by slight uncontrollable variations of operation as the ultimate optimum design, with the minimum possible film tension, is approached.

If we consider the mechanism without any inertia at all, or with low inertia values in proportion to the frictional motion resistance, values inherently involved; then on such film slippage the take-up spool will instantly go to a relatively high speed until the slippage is taken up. During that period in which the take up "runs away" out of control, the movement speed suddenly and proportionately drops, causing a momentary hiatus in the proper exposure of the film in the camera or projector.

The shutter supplies an inertia in the mechanism to prevent or smooth out that hiatus. Its inertia prevents the movement from suddenly slowing down, and the take up from suddenly speeding up. The film exposure is consequently kept more nearly uniform while the take-up reel slowly increases speed to slowly take up the slippage with a minimum of final snap action on the film.

In the event of film breakage from any cause, the film movement will either come to a stop or to a relatively low speed if the break is between the movement and the take-up spool, or as soon as the break passes the movement. The take-up then increases its speed, with corresponding speed decrease of the movement. The relative speeds reached by the movement and take-up are then controlled by an inverse function of the relative energies required to drive them; and as the energy required to operate the movement and all directly connected parts including the shutter and the film feeds at normal speed is much greater than that required to rotate the free take-up at normal speed, the movement speed drops until those two energies are equal. In practice the movement either stops or comes to very low speed. That fact is immediately evident to the operator, and no excessive pile-up of the film takes place between the movement and the take-up before he can stop the mechanism.

As has been indicated, the desired over-all gear ratio may be obtained by any suitable combination of the three gear ratios in the system shown in Fig. 3. The over-all ratio there is three-to-one; made up of a one-to-three ratio between the movement shaft and the ring gear, a three-to-one ratio in the differential gearing between the ring gear and the sun gear, and a three-to-one ratio between the sun gear and the take-up. The first mentioned ratio, between the movement and the ring gear, is convenient because it allows the differential mechanism as a whole to operate at relatively low speed. In the design as shown in Fig. 3, the relative decrease in that ratio from the one-to-one ratio which would obtain if the movement shaft were driven directly from the ring gear, is offset by having the ratios in the differential and between the sun-gear and take-up high enough to give an over-all ratio of three-to-one.

Conversely, for example, if the gear ratio of ring-gear to sun-gear be decreased (e. g. sun gear made relatively larger) that decrease can be offset by increasing either or both of the other gear ratios. Thus the sun gear can in effect be made the same size as the ring gear (the differential becomes one of the "automobile" type) with a gear ratio of one-to-one. The desired over-all gear ratio may then be maintained by increasing either or both of the ratios between movement and ring gear, or between sun gear and take-up.

Finally I note that it is theoretically immaterial which of the three elements of the differential gearing is the one to be initially driven, and which ones drive the movement and the take-up. Certain arrangements, such as the one shown here, may be more practical than others; but it is not necessary, for instance, that the planetary carrier be the initially driven element.

It can be shown that in any differential gearing, regardless of type, the velocities of the three elements is expressed by $$(4) \quad 2PW_{pc} = SW_s + RW_r$$

where,

P = radius of planetary axis
S = pitch radius of sun gear
R = pitch radius of ring gear
$W_{pc}$ = angular velocity of planetary carrier
$W_s$ = angular velocity of sun gear
$W_r$ = angular velocity of ring gear The expression (4) above holds true regardless of which is the driven member and regardless of what the other two members may drive. Within physical limitations, any conceivable relation between the three angular velocities and their associated torques can be obtained within the expression (4). And if for any reason, the relative values of S, R and P do not in themselves give the desired velocity and torque ratios between the movement and take-up, then those desired ratios can be reached by interposing suitable gearing external of the differential gearing and between its two driven members and the film movement and take-up.

I claim:

1. In kinetographs, the combination of film driving and exposing mechanism including a cyclic film feeding movement by which a predetermined feed-length of film is fed past an exposure point for each cycle of movement operation, a take-up spool on which the film is taken from the movement and wound in a coil of progressively changing diameter as the winding proceeds, the minimum peripheral length of coil on said spool being a large multiple of the cyclic feed-length of the movement, and driving means for said mechanism and the take-up spool comprising a differential gearing of three elements, initial driving means for one of the elements, and direct driving connections between the other two elements and said mechanism and take-up spool, respectively, the over-all gearing ratio from said mechanism through the differential gearing to the take-up spool being substantially as high as is consistent with maintenence of take-up tension on the film by reaction from the driving torque of said mechanism.

2. The combination defined in claim 1 and in which the multiple is of the order of sixteen, and the over-all gearing ratio is approximately three to one.

3. The combination defined in claim 1, and in which the film driving and exposing mechanism also includes a rotating shutter cooperating with the movement, and in which said mechanism has a relatively high rotational inertia as compared with that of the take-up spool.

4. In kinetographs, the combination of film driving and exposing mechanism including a movement by which the film is driven past an exposure point at relatively uniform average speed and including a rotating shutter cooperating with the movement, said driving and exposing mechanism having a substantial rotational inertia, a take-up spool on which the film is taken from the movement and wound in a coil of progressively changing diameter as the winding proceeds, the rotational inertia of the take-up spool being relatively low as compared to that of said mechanism, and driving means for said mechanism, and the take-up spool comprising a differential gearing of three elements, initial driving means for one of the elements, and direct driving connections between the other two elements and said mechanism and take-up spool, respectively, the over-all gearing ratio from said mechanism through the differential gearing to the take-up spool being substantially as high as is consistent with maintenance of take-up tension on the film by reaction from the driving torque of said mechanism.

5. The combination defined in claim 1 and in which the over-all gearing ratio is approximately three-to-one.

GEORGE A. MITCHELL.

REFERENCES CITED

The following references are of record in the file of this patent:

UNITED STATES PATENTS

| Number | Name | Date |
|---|---|---|
| 1,235,249 | Salfisberg | July 31, 1917 |
| 2,090,130 | Kittel | Aug. 17, 1937 |
| 2,147,776 | Mitchell | Feb. 21, 1939 |
| 2,196,358 | Henisch | Apr. 9, 1940 |
| 2,201,886 | Dalotel | May 21, 1940 |

FOREIGN PATENTS

| Number | Country | Date |
|---|---|---|
| 3,496 | Great Britain | Sept. 12, 1912 |